350-96.24 SR

E197A XR 3,521,262

96.24

July 21, 19[illegible] 3,521,262

MAGNETO-OPTIC READOUT OF MULTI-STATE ANALOG STORAGE MAGNETIC FILM ELEMENTS

Filed May 28, 1969

INVENTOR
MAYNARD C. PAUL
BY Thomas J. Nikolai
ATTORNEY

United States Patent Office 3,521,262

Patented July 21, 1970

3,521,262

MAGNETO-OPTIC READOUT OF MULTI-STATE ANALOG STORAGE MAGNETIC FILM ELEMENTS

Maynard C. Paul, Minneapolis, Minn., assignor to Sperry Rand Corporation, New York, N.Y., a corporation of Delaware Filed May 28, 1969, Ser. No. 828,623
Int. Cl. G11c 11/42, 13/04; G11b 11/10
U.S. Cl. 340—174.1 5 Claims

ABSTRACT OF THE DISCLOSURE

This invention describes magneto-optic readout means for sensing the remanent magnetization state of a magnetic film by determining the location or position of a domain wall in a partially switched film. The Faraday or Kerr effect is relied upon to establish two distinguishable light intensities determined by the magnetic state of the element. Fiber-optic rods positioned in close proximity to the Faraday or Kerr apparatus are used to convey light energy from discrete points on the film element to a detector which operates to identify the location in the film at which the domain wall is positioned.

SUMMARY OF THE INVENTION

Figure 1A:
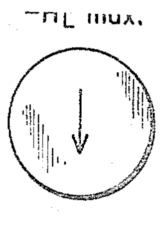

In the Robert A. White et al. application, Ser. No. 456,365, filed May 17, 1965, now Pat. No. 3,457,554 and assigned to the assignee of the present invention, there is described a method of operating a thin ferromagnetic film memory element as an analog signal storage device. As is explained in that application the characteristic phenomenon of the thin ferro-magnetic film element known as "dispersion" is utilized to permit the storage of discrete amplitude levels of an analog signal as a function of the degree of rotation of the element's magnetization when subjected to coincident longitudinal drive field, the intensity of which is a function of the analog signal amplitude, and a transverse drive field.

As is further explained in that application, an analog signal from a first source is gated into the magnetizable film element by a strobe pulse from a second source. The analog signal is coupled to the magnetizable element as a longitudinal drive field component, the maximum intensity of which is limited to a level well below the switching threshold of the magnetizable element, such that the analog signal alone is incapable of affecting the flux level thereof. The strobe pulse is coupled to the magnetizable element as a transverse drive field component and has an intensity sufficient to change the magnetizable element's magnetization to become orthogonal to its easy axis. With a magnetizable element possessing a suitable angular dispersion characteristic, the longitudinal drive field component produced by the analog signal biases the magnetizable element's magnetization away from the hard axis by a degree that is a function of the intensity of the longitudinal drive field. At the particular time that the analog signal amplitude signal is to be sampled, the strobe pulse generated transverse drive field is removed, permitting the analog signal to set the magnetization of the magnetizable element into a discrete level of partial switching, which level of partial switching is representative of the amplitude of the analog signal at the time of the removal of the transverse drive field.

The Paul E. Oberg application, Ser. No. 686,413 filed Nov. 29, 1967, describes a method for producing thin-film ferromagnetic storage elements having an angular dispersion curve that is linear over substantially 100% of its irreversibly switchable magnetization. It is found that films of this type are particularly suitable for analog storage operations.

As is pointed out in the Oberg application, when the technique described in the White et al. application is used to record analog information, the magnetic film element in which the information is stored exhibits two discrete domains separated by Bloch or Neel walls. The position of this wall is determinative of the analog value sampled.

The present invention provides apparatus for reading out the information content of a thin ferromagnetic film element analog storage device by optically sensing the precise location of the domain wall. More specifically, the Faraday effect or Kerr effect is used to establish two distinguishable light intensities of transmitted or reflected light from the thin film element, the discontinuity between the two distinguishable intensities being the wall boundary. By providing a plurality of light conducting channels at discrete positions across the width of the film element it is possible to convey the intensity information at precise points to suitable detection and display apparatus. In fact, through proper calibration, it is possible to correlate the position of the wall boundary with the magnitude of the analog signal which is stored in the film element.

Accordingly, it is an object of this invention to provide a means for reading out the information from a thin film analog storage element.

It is another object of this invention to provide magneto-optic means for sensing the information contained in an analog storage film element.

Further objects and advantages of the invention will become apparent as the following description proceeds and the features of novelty which characterize the invention will be pointed out with particularity in the claims annexed to and forming part of this specification.

Figure 2:
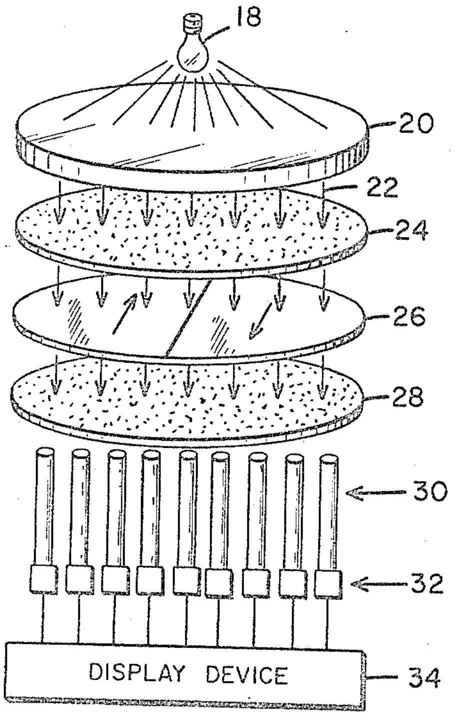
Figure 3:
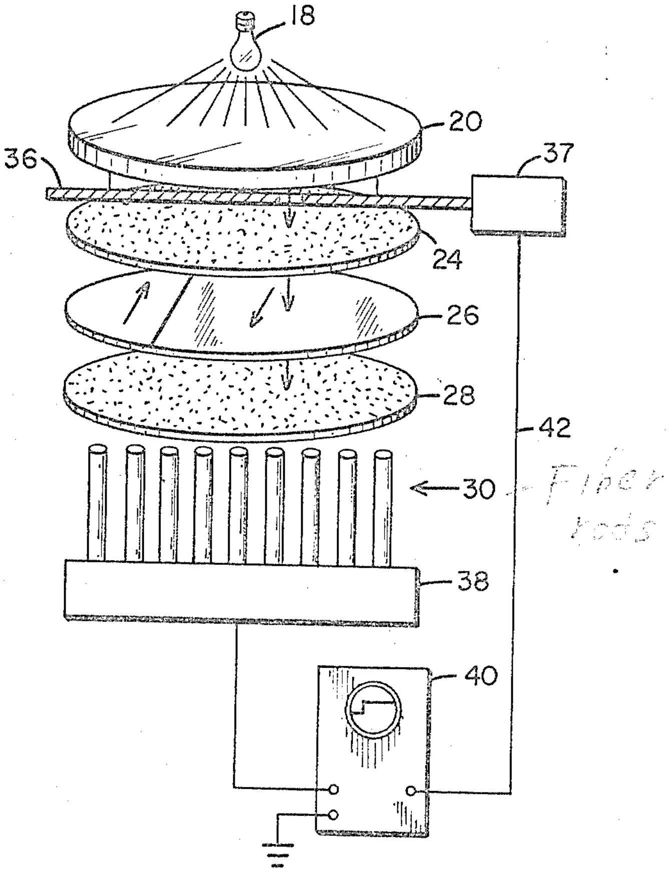

For a better understanding of the invention, reference may be made to the accompanying drawings in which:

FIGS. 1*a* through 1*e* illustrate typical thin ferro-magnetic film analog storage elements in various states of partial and total switching;

FIG. 2 illustrates a first embodiment of the invention wherein a plurality of photoelectric cells are utilized to sense the location of the wall boundary; and FIG. 3 illustrates another embodiment of the invention wherein cathode ray tube type display apparatus is used to indicate the location of the wall between oppositely oriented magnetic domains.

Referring to FIG. 1*a*–1*e* there is shown pictorially a thin ferromagnetic film analog storage element in various states of partial and total switching. As is explained in the Rubens Pat. 2,900,282, when a magnetic material having a composition of approximately 82% nickel and 18% iron is evaporated and condensed upon a substrate in a vacuum and under the influence of an orienting magnetic field, thin ferromagnetic films having single domain properties are obtained. Also, in the Rubens et al. Pat. 3,030,612 there is described a method for switching the magnetic state of such a thin film through the simultaneous application of orthogonal fields such that the magnetization is reversed through a rotational process rather than through wall motion switching.

Figure 1B:
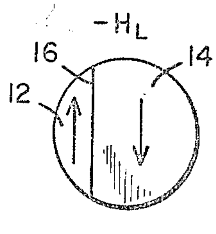
Figure 1C:
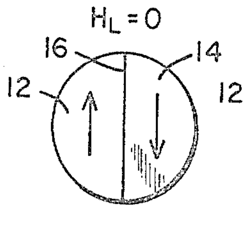
Figure 1D:
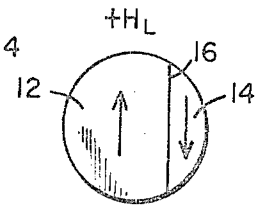
Figure 1E:
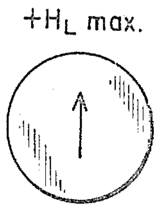

FIGS. 1*a* through 1*e* illustrate diagrammatically the reversal of magnetization in a thin film from a first state, through several stages of partial switching to the opposite state. In FIG. 1*a* all of the films magnetization is oriented generally in a first direction from having applied a relatively large negative longitudinal field while removing the transverse field. FIG. 1*b* shows the condition of a thin ferromagnetic film when a relatively small negative longitudinal field has been applied to it. As is shown in FIG. 1*b*, the film is approximately 25% switched as indicated by the relative sizes of the domains 12 and 14 separated by wall 16. In FIG. 1*c* no longitudinal field has been applied to the film and when the transverse field was removed, the film assumed a state which was approximately 50% switched as indicated by the relative size of the domains 12 and 14 thus representing a "zero" state. FIG. 1*d* shows the condition of the film when a relatively small *positive* longitudinal field was applied while removing the transverse field. Note that the film is approximately 75% switched and that the domain wall is on the other side of the "zero" wall position. FIG. 1*e* illustrates a film that has been totally switched from having applied a relatively large *positive* longitudinal field while removing the transverse field such that all of the magnetization is now oriented in a direction opposite to that originally illustrated in FIG. 1*a*.

By observing FIGS. 1*a* through 1*e* it can be seen that position of the wall 16 is a measure of the degree of partial switching in the film and indicates both amplitude and polarity of the signal field $H_L$. As has been fully set out in the aforementioned White et al. application, the degree of partial switching is a measure of the amplitude of an analog signal applied as a longitudinal field to the film. Hence, by observing the position of the domain wall 16, it is possible to read out, after the event, an indication of the magnitude of the the analog signal previously applied to the film.

FIG. 2 illustrates a first embodiment of the invention to effect the desired readout of the domain wall location.

Referring to FIG. 2, there is shown an apparatus for detecting magneto-optically the precise location of the domain wall. Since, as has been mentioned, this wall location is directly related to the magnitude of an analog signal applied to the film, the device of FIG. 2 is effective to indicate that magnitude. As shown in FIG. 2, there is a source of light 18 which is passed through a collimator lense 20 to produce parallel light rays 22. These light rays are passed through a suitable polarizing element 24 and onto the thin ferromagnetic analog storage element 26. The plane polarized light transmitted through the thin ferromagnetic film element 26 passes through an analyzer 28 to a light channeling means here shown as a set of fiber-optic rods indicated generally by the numeral 30. These fiber-optic rods confine the light energy impinging upon the ends thereof to the boundaries of the rod and convey the light to a corresponding set of photocells indicated generally by the numeral 32. The outputs from the photocells connect to a suitable display device 34 to be described.

For a better understanding of the operation of the arrangement shown in FIG. 2, background information concerning the so-called Faraday effect and the Kerr effect can be gained from the Oberg et al. Pat. 3,155,944. As is explained in that patent, when plane polarized light is transmitted through a thin ferromagnetic film, the plane of polarization of the incident light is rotated. Therefore, if the analyzer 28 is initially adjusted to provide no light transmission therethrough when the film is in one of its saturated conditions, upon switching of the thin ferromagnetic film, the plane of polarization of the incident light is rotated and light will be permitted to pass through the analyzer, at least over a portion of the film. Over the portion of the film which remains unswitched, no light will pass through the analyzer. Hence, the Faraday effect is used to advantage in producing two distinguishable intensities of light determined by the magnetic state of the film element.

While not specifically illustrated in the drawings, it should be obvious to one skilled in the art that instead of relying upon the Faraday effect, one could utilize the Kerr effect, i.e., operate upon the plane polarized light reflected from rather than transmitted through the film element. This feature, too, is described in the aforementioned Oberg et al. patent.

Since the output from the analyzer is light of two distinguishable intensity levels determined by the degree of partial switching of the film element 26, the boundary or discontinuity between the two light intensity levels is indicative of the position of the domain wall. One end of the fiber-optic rods is closely juxtaposed with respect to the analyzer element 28 so as to pick up only the light intensity emerging from a discrete point on the analyzer. Since, in the preferred embodiment, the analyzer element 28, is closely positioned with respect to the thin film element 26, the one end of the fiber-optic rods 30, in effect, "observes" the magnetization state existing at discrete areas of the thin film element 26. The number of fiber-optic rods or light channels employed in the system is a matter of choice and depends upon the degree of resolution desired.

Also, the arrangement shown in FIG. 2, shows only a single fiber-optic rod associated with discrete points across the film in the transverse direction, i.e., transverse to the easy axis of magnetization of the film. For greater sensitivity, it has been found to be convenient to include a number of fiber-optic rods aligned in discrete columns with the rods in each column providing an input to the same photocell 32. Thus, rather than have a single row of fiber-optic rods extending across the surface of the analyzer, columns of fiber-optic rods may be extended across the surface.

The photocells 32 provide an indication of the magnitude of the light intensity impinging upon them. Hence, photocells associated with the portion of the thin ferromagnetic film which remains unswitched will be in a dark condition, whereas those photocells associated with the portion of the film that has been switched will be subjected to illumination and therefore will exhibit a different remanent state. By noting which photocells in the group have their output indicative of other than the dark state, one is able to discern the exact location of the domain wall within the limits of resolution provided by the system.

FIG. 3 illustrates an alternative embodiment of the invention. In this figure, an optical scanning device 36 is interposed between the collimator 20 and the polarizer 24. In FIG. 3, the scanner 36 is illustrated as a slit in a rotatable mask which when rotated by means 37 causes a beam of light to scan or traverse the polarizer 24. Other light scanning techniques are also suitable. The beam of plane polarized light emanating from the polarizer 24 therefore scans across the thin ferromagnetic film element 26 to be transmitted through or reflected from the film element 26 to the analyzer 28 depending upon whether the Faraday effect or Kerr effect is to be relied upon. A series of fiber-optic rods is disposed in close relationship with the analyzer so as to "observe" discrete segments of the thin film element 26. In this embodiment, however, rather than having a plurality of photocells, one for each of the fiber-optic rods, a single photoelectric cell 38 is disposed to receive the light output from each of the fiber-optic rods 30. The output from the photocell 38 is connected to the input of a cathode ray oscilloscope display device 40. The triggering of the sweep on the cathode ray oscilloscope 40 is synchronized with the rotation of the scanner 36 over line 42 so that the electron beam in the cathode ray oscilloscope traverses the screen at the same rate that the beam of light passing through the slit in scanner 36 scans the film element 26. As a result, there will be displayed on the face of the cathode ray oscilloscope a wave front which indicates the exact position at which the discontinuity of light intensity passing through the analyzer is observed. Since, as mentioned previously, this corresponds to the exact location of the domain wall in the magnetic film, the readout on the cathode ray oscilloscope can be correlated to the magnitude of the analog signal applied to the thin ferromagnetic film element to cause it to be partially switched.

Thus it can be seen, that there is provided by this invention a novel arrangement for reading out optically the information state of the thin ferromagnetic film element used in an analog storage application.

I claim:

1. Apparatus for detecting the information content of a thin ferromagnetic film analog storage element comprising:
   a thin ferromagnetic film element having an easy axis of magnetization and a predetermined angular dispersion characteristic adapted to store analog information as a function of the degree of partial switching thereof;
   means for focusing plane polarized light on said film;
   analyzer means positioned to receive light transmitted through or reflected from said film element and adapted to simultaneously transmit two distinguishable intensities of light determined by the magnetic state of said film element;
   light channeling means positioned with respect to said analyzer means for channeling the light passing through discrete positions of said analyzer into a plurality of beams; and
   means associated with said channeling means for indicating the position in said film where a discontinuity of light intensity occurs.

2. Apparatus as in claim 1 wherein said light channeling means comprises a plurality of fiber-optic rods aligned in a row and having one end thereof positioned in close proximity to said analyzer means, said row extending across said analyzer means in a direction transverse to said easy axis of said film element.

3. Apparatus as in claim 2 and further including a plurality of photocells, there being one cell associated with each of said plurality of fiber-optic rods, adapted to receive the light energy passing through said rod.

4. Apparatus as in claim 1 wherein said last means includes a plurality of photocells individually associated with said light channeling means; and
   display means for indicating said discrete position at which a discontinuity of light intensity occurs.

5. Apparatus as in claim 1 wherein said means for focusing plane polarized light on said film includes means for causing a beam of said plane polarized light to repetitively scan said film element; and
   wherein said last means includes a photo-cell adapted to receive light energy from said light channeling means a cathode-ray tube display connected to receive the output from said photo-cell and having its sweep synchronized with the rate of scan of said beam across said film element.

References Cited

UNITED STATES PATENTS

| | | | |
|---|---|---|---|
| 3,164,816 | 1/1965 | Chang | 340—174.1 |
| 3,229,273 | 1/1966 | Baaba | 340—174.1 |
| 3,368,209 | 2/1968 | McGlauchlin | 340—174.1 |

TERRELL W. FEARS, Primary Examiner

U.S. Cl. X.R.

350—151